United States Patent [19]

Fimoff et al.

[11] Patent Number: 4,633,514

[45] Date of Patent: Dec. 30, 1986

[54] KEYBOARD CONTROLLED TELEVISION RECEIVER

[75] Inventors: Mark Fimoff, Hoffman Estates; Thomas J. Zato, Palatine, both of Ill.

[73] Assignee: Zenith Electronics Corporation, Glenview, Ill.

[21] Appl. No.: 668,109

[22] Filed: Nov. 5, 1984

[51] Int. Cl.[4] .......................... H04B 1/16; H04B 9/00
[52] U.S. Cl. .................................... 455/151; 455/352; 455/603; 358/194.1; 340/696
[58] Field of Search ...................... 358/194.1; 455/151, 455/603, 608, 617, 352; 340/696

[56] References Cited

U.S. PATENT DOCUMENTS

| | | |
|---|---|---|
| 3,899,760 | 8/1975 | Funston ............................ 455/352 X |
| 3,903,472 | 9/1975 | Wahl ................................... 455/352 |
| 4,405,923 | 9/1983 | Matsuoka et al. ............. 340/696 X |
| 4,426,662 | 1/1984 | Skerlos et al. .................. 358/194.1 |
| 4,499,464 | 2/1985 | Knox et al. ..................... 340/696 X |

Primary Examiner—James J. Groody
Assistant Examiner—E. Anne Toth

[57] ABSTRACT

A microprocessor controlled television receiver includes a decoder input for receiving coded data streams for controlling functions of the television receiver from a remote and a local keyboard. Microprocessor based arbitration means scan the keys of the local keyboard and control operation of a gate for selectively coupling the data streams from the remote keyboard and the local keyboard to the decoder of the television microprocessor. The arbitration means assures noninterference between the respective data streams.

3 Claims, 3 Drawing Figures

KEYBOARD CONTROLLED TELEVISION RECEIVER

BACKGROUND OF THE INVENTION

This invention relates generally to microprocessor controlled television receivers and particularly to microprocessor controlled television receivers that include a keyboard and that are also remotely controllable.

The development of electronic tuning for television receivers not only significantly enhanced receiver performance and reliability, but also simplified viewer control of receiver tuning by enabling tuning by channel number. Electronic tuning systems for all practical purposes have even eliminated the need for fine tuning of the receiver. Such tuning systems use varactor diodes that change their capacitance as a function of applied voltage, which characteristic is conveniently controllable by means of digital control circuitry. With the widespread availability of low cost microprocessors, additional functions of the television receiver have been digitally controlled which has led to even greater versatility and substantial simplification in manufacturing. It also resulted in the viewer having a degree of control over the television receiver which has heretofore been unattainable.

With microprocessor circuitry and with digital control techniques, most television receiver functions may now be controlled at the receiver by the simple actuation of one or more buttons or keys. The keys are generally arranged in a format similar to that commonly used in calculators and portable computers, with the keys being designated by their corresponding functions. The keyboard is regularly "scanned", on a time-shared basis, by circuitry in the microprocessor which determines when a key has been actuated, correlates the actuated key with the desired control function and produces a corresponding output for carrying out that control function. Such a keyboard scanning technique is well known in the prior art and is exemplified in Zenith Television Receiver Model No. SZ2577.

Commensurate with the increase in local control exercisable by the viewer at the television receiver itself, giant strides have been taken in remote wireless control of basic receiver functions, such as channel selection, volume level, color level, tint, and receiver on/off. Over the years, wireless control hand units have been used with television receivers with a great deal of success. With the advent of integrated circuitry, the number of receiver functions that may be conveniently controlled from a remote point has increased while the size of the wireless control hand units has decreased. A few years ago hand-held control units included three or four buttons or keys for indicating a corresponding number of functions. Today, the hand-held control unit may include many buttons in a keyboard arrangement for activating a number of functions and for providing direct access to television channels.

In the Zenith model television receiver referred to above, an integrated circuit is provided in the hand-held control unit for energizing the circuitry when a key is actuated for determining the actuated key and for generating and transmitting an appropriate control signal. The control signal consists of coded bursts of infrared (IR) energy that are received by an appropriate IR receiver at the television set, detected and converted into a series or stream of binary bits. The series of bits is applied to an input of the microprocessor in which the actual decoding circuitry is resident. The decoding circuitry functions to correlate the desired control function with the particular stream of coded binary bits received and for initiating appropriate control circuitry.

In practice, reception of a coded IR signal from the remote keyboard and "decoding" thereof by the microprocessor overrides function control signals from the local keyboard and vice versa. The system is subject to error with codes being interrupted by noise and the like.

Further, the rapidly expanding use of digital circuits in television receivers, has placed an increased burden on the microprocessor and has significantly increased the complexity of needed software programming. As a result, constraints have been placed on the ability of the microprocessor for controlling local keyboard scanning and function control decoding.

There is, therefore, a need in the art for a simple, reliable microprocessor-based keyboard controlled television receiver that is also remotely controllable.

OBJECTS OF THE INVENTION

Accordingly, a principal object of the invention is to provide an improved television receiver.

Another object of the invention is to provide a keyboard controlled remote television receiver that solves the problems of the prior art.

A further object of the invention is to provide a television receiver that may be controlled by remote or local signals without interference.

SUMMARY OF THE INVENTION

In accordance with the invention a television receiver has remote keyboard means and local keyboard means, each capable of selectively generating similar coded signals for controlling a plurality of functions. The receiver includes arbitration means for precluding interference between the coded signals from the remote keyboard and the coded signals from the local keyboard.

BRIEF DESCRIPTION OF THE DRAWINGS

Other objects and advantages of the invention will become apparent upon reading the following description thereof in conjunction with the drawings in which.

DESCRIPTION OF THE PREFERRED EMBODIMENT

Figure 1:
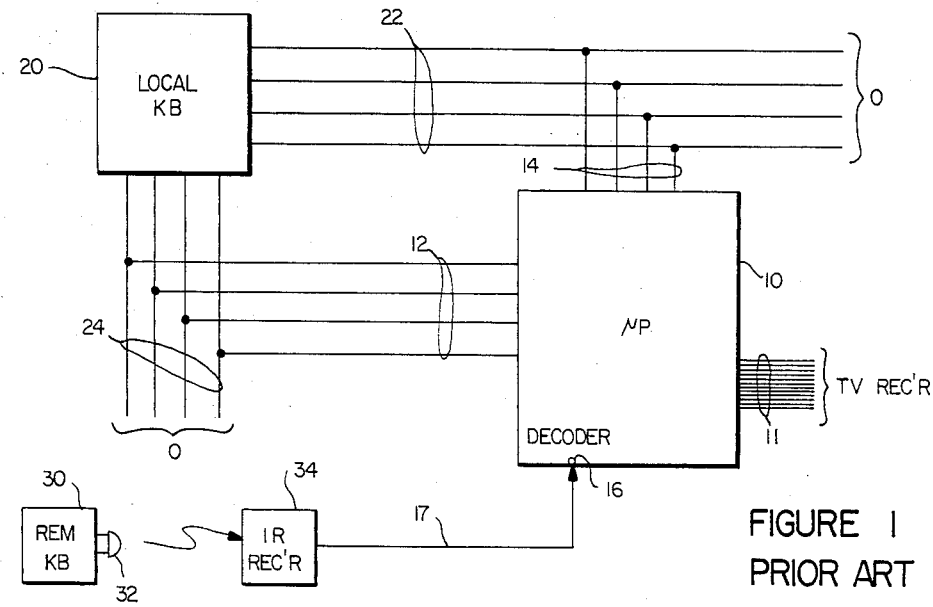
FIG. 1 represents a simplified block diagram of a prior art keyboard controlled microprocessor-based television receiver which is also remotely controllable.

Referring to FIG. 1, labelled Prior Art, a microprocessor 10 includes a plurality of leads 12 and 14 which are coupled to a local keyboard 20 via an appropriate number of connecting leads 22 and 24, respectively. Leads 12 and 14 from microprocessor 10 are supplied to other sections of the television receiver (not shown) as is indicated by the letter "O". Microprocessor 10 also includes a decoder input terminal 16 that is supplied from a receiver detector unit 34 over a lead 17. A hand-held remote unit 30 includes a keyboard controlled IR transmitter 32 for transmitting a coded IR signal for receipt and detection by unit 34. The resulting output of unit 34 is a stream of binary coded bits that is supplied to the decoder input of the microprocessor where decoding is accomplished. The appropriate control function of the television receiver (not shown) is activated by energization of one or more output leads 11.

Those skilled in the art will be familiar with the scanning technique employed in the circuit of FIG. 1. The microprocessor, on a time-shared basis, sends a pulse out on each of its leads 12, in sequence, while it checks for pulses on each of its leads 14, in sequence. An actuated key on local keyboard 20 will thus be detected for activating further programming and memory in the microprocessor to perform the desired control function over leads 11. The microprocessor conventionally includes verification circuitry and associated software to assure that a proper key closure has occurred and that a proper key release has occurred. These circuits and software functions are generally referred to as "debounce" and "key correlation".

The hand-held remote unit 30 includes a keyboard and an integrated circuit for detecting a key actuation and for producing bursts of IR energy in appropriate coded patterns. The unit includes its own battery power supply. The prior art Zenith television receiver referred to above incorporates circuitry and features identical to that of FIG. 1.

Figure 2:
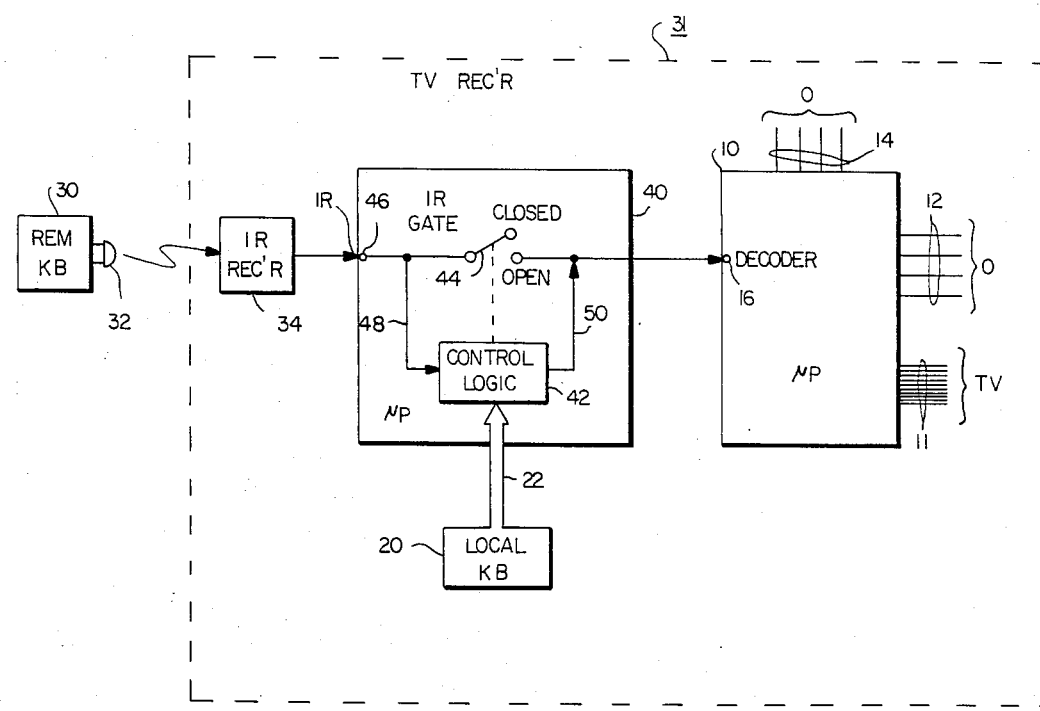
FIG. 2 is a simplified block diagram of such a receiver constructed in accordance with the invention.

In FIG. 2, the TV receiver is generally indicated by a dashed line block 31. The hand-held remote unit 30, with its keyboard (not shown) and IR transmitter 32, supplies coded bursts of IR energy to IR receiver and detector unit 34 as in FIG. 1. Microprocessor 10 still includes a decoder input 16 and internal circuitry required to control actuated viewer-television receiver functions over a plurality of leads 11. The pluralities of leads 12 and 14 supply other sections of the television receiver for performing other functions that are not generally viewer-controllable. It should be noted, however, that leads 12 and 14 are not coupled to a local keyboard. Thus, the software programming for the microprocessor is substantially simplified over that for the microprocessor in the prior art circuit of FIG. 1.

Local keyboard 20 is functionally coupled over a multi-lead control bus 22 to an additional microprocessor 40 interposed between the output of IR receiver 34 and decoder input 16 of microprocessor 10. Local keyboard 20 is seen to be scanned by microprocessor 40. In response to a key closure on keyboard 20, microprocessor 40 generates control signals of the same type and character as those developed at the output of IR receiver 34 in response to detection of IR coded signals from transmitter 32, namely a coded data stream consisting of binary bits of predetermined bit length and word durations. A control logic block 42 determines the operation of an "IR gate" 44 schematically represented by a switch coupled between an input terminal 46 of microprocessor 40 and decoder input 16 of microprocessor 10. It will be appreciated that the schematic showing is illustrative only and the IR gate "function", as well as the control logic function, is performed by the software in microprocessor 40. When IR gate 44 is "closed", the output of IR receiver 34 is disconnected from decoder input 16 and coded signals generated under control of local keyboard 20 are allowed to pass to the decoder input over a lead 50 from control logic 42. Hence, the switch is shown in an open position.

When IR gate 44 is "opened", the coded signals from IR receiver 34 pass to decoder input 16 and the switch is shown in a closed position.

The output of IR receiver 34 is sampled, over a lead 48, by microprocessor 40 to assure that no conflict exists with the locally generated signals. Because the nature of the coded IR signals is known, such an arrangement can be made very reliable. The IR gate determines when a coded signal is passed to the decoder input and thus functions as an arbitration means. As will be more fully explained in conjunction with the flow chart of FIG. 3, the software program of microprocessor 40 is such that the two signals, i.e. that generated in response to a key actuation on the remote keyboard and that generated in response to a key actuation on the local keyboard, are not only selectively passed to the decoder input of microprocessor 10, but are prevented from breaking into a coded signal "in progress" or from "tacking" on to the beginning or end of a coded signal in progress. Microprocessor 40 is also able to determine when the coded signal at the output of IR receiver 34 is, in reality, noise, based upon the known duration of the control signal data stream.

Those skilled in the art recognize that the makeup of the data stream, the codes used, the bit length and control key debounce and correlation times are all a matter of design choice. References to actual times will therefore be understood to be representative only. The bit word length in the actual embodiment may be either six or seven in number, depending upon the particular function. The bit duration is six milliseconds (ms) with the longest word taking 79.9 ms. The flow chart does not delineate the keyboard scanning time, debounce time or keyboard confirmation time and the like, but merely describes the functioning of the arbitration means for opening and closing the IR gate.

Figure 3:
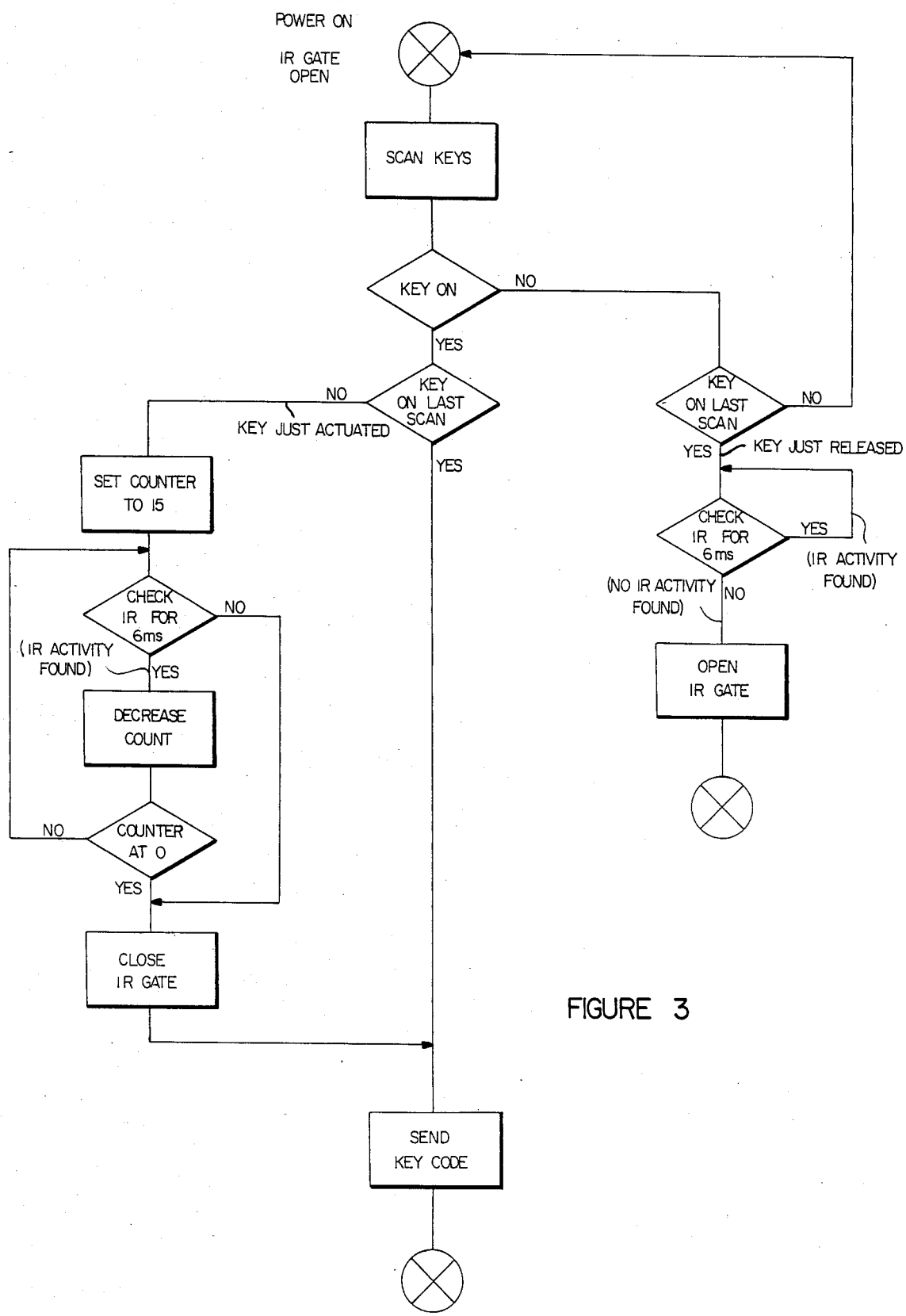
FIG. 3 is a flow chart of the microprocessor program for determining coupling of the respective coded control signals.

With reference to FIG. 3, the top of the flow chart assumes that upon "power on" of the television receiver, IR gate 44 is open which corresponds to the switch coupling received IR information to decoder input 16 of microprocessor 10. The keyboard microprocessor begins to scan the local keyboard keys. If no key closure is detected and no key closure was effected during the previous scan, the scanning routine is repeated. During this time, the control logic of microprocessor 40 is continuously sampling the detected IR code signals from the remote transmitter and coupling them to the decoder input.

Once a key closure is detected a decision is made as to whether a key was also closed during the previous scan. If not, it indicates that this is the first detected key closure and a subroutine is entered to check for IR activity at the output of IR receiver 34. Specifically, a counter is set to 15 and the IR input line (not shown) is sampled for a period of 6 ms, which is the period of one data bit. If there is no IR activity found, indicating that no IR coded signal is being transmitted, the IR gate is closed and the bit code for the detected key closure is sent to the decoder input 16 of microprocessor 10. Since no IR activity was found the arbitration means assures that gate operation does not occur while an IR code is in progress. It also assures that the new transmission will not be tacked directly onto the end of a previous transmission. Further, by closing the IR gate, a signal code from the transmitter cannot interfere with the local keyboard signal code that has just been transmitted.

If IR activity is found, the count in the counter is decreased by 1 and the counter is checked for a zero value. If the counter has not reached zero, IR activity is again checked for 6 ms and, if there is no IR activity, the gate is closed and the coded signal corresponding to the key closure is sent as indicated above. If IR activity is found continuously until the counter is decremented to zero, it will have indicated IR activity for a total of 15 cycles of the subroutine, which is equivalent to 90 ms. In that event it is assumed that the IR activity is noise since the longest valid IR code has a duration of 80 ms. Therefore, if the counter reaches zero, the IR gate is closed and the signal code for the detected key closure is sent. The continual checking for IR activity for 6 ms time periods also assures that the IR signal code being received, that is, in progress, is completed before a detected local key signal code is transmitted.

The program now returns to scanning the local keyboard with the IR gate in the closed position. If the depressed key remains closed, the same routine is repeated and the signal code is sent again. If the depressed key is released, another subroutine is entered and IR activity is again checked for 6 ms, since the key was depressed during the last scan, thus indicating that a key release has just occurred.

The checking for IR activity for 6 ms is repeated until a period of no IR activity is found, whereupon the IR gate is opened to enable signal codes from the remote transmitter to be coupled to the decoder input of microprocessor 10. This subroutine also assures that the IR gate is opened only during a "gap" between IR signal codes and not in the middle of an IR signal code.

Thus, with the invention, it is seen that interference between the remotely transmitted coded signals and the identical type coded signals from the local keyboard is prevented. Further, the system has the capability of differentiating between remotely transmitted coded signals and noise. It is recognized that numerous changes in the described embodiment of the invention will be apparent to those skilled in the art without departing from its true spirit and scope. The invention is to be limited only as defined in the claims.

What is claimed is:

1. In combination:
   a television receiver having a plurality of controllable functions;
   remote keyboard means for generating remote digitally coded signals in the form of bursts of IR energy for selectively controlling said functions;
   IR receiver means for receiving said IR signals and generating therefrom coded data streams;
   first microprocessor means having a decoder input for receiving said coded data streams, determining therefrom the corresponding function and for controlling performance of that function;
   local keyboard means for generating similar digitally coded data streams for selectively controlling said functions when applied to said decoder input;
   second microprocessor means having arbitration means including gate means for selectively coupling said data streams from said remote keyboard means and from said local keyboard means to said decoder input; and
   said arbitration means assuring the absence of one of said coded data streams before operating said gate means to couple to other of said coded data streams to said decoder input.

2. The combination of claim 1 wherein said second microprocessor means includes means for periodically scanning said local keyboard means to determine a key closure.

3. The combination of claim 2 wherein said arbitration means is capable of distinguishing between encoded signals from said remote keyboard means and noise.

* * * * *